Sept. 1, 1959 L. D. BARRY 2,902,544

TAPERED MAGNETIC HEAD

Filed June 17, 1953

INVENTOR.

Leonard D. Barry 2,902,544
Patented Sept. 1, 1959

2,902,544

TAPERED MAGNETIC HEAD

Leonard D. Barry, Detroit, Mich.

Application June 17, 1953, Serial No. 362,364

15 Claims. (Cl. 179—100.2)

This invention relates to magnetic heads and in particular to the gap shim and pole pieces thereof.

An object of this invention is to provide tapered pole pieces to reproduce signals having wave lengths shorter than the effective gap of the reproducing head.

A further object is to reproduce recorded wave lengths which are either shorter, as long as, or longer than the gap with a minimum of frequency preference or discrimination.

Another object is to provide longer gaps (thicker gap pieces) for playback than is present practice, which give good response at low frequencies, and still have good response at relatively high frequencies thus increasing the frequency range and output of the pickup.

Other objects and advantages may be apparent from the following description of this invention, illustrated by the accompanying drawing wherein.

Figure 1:
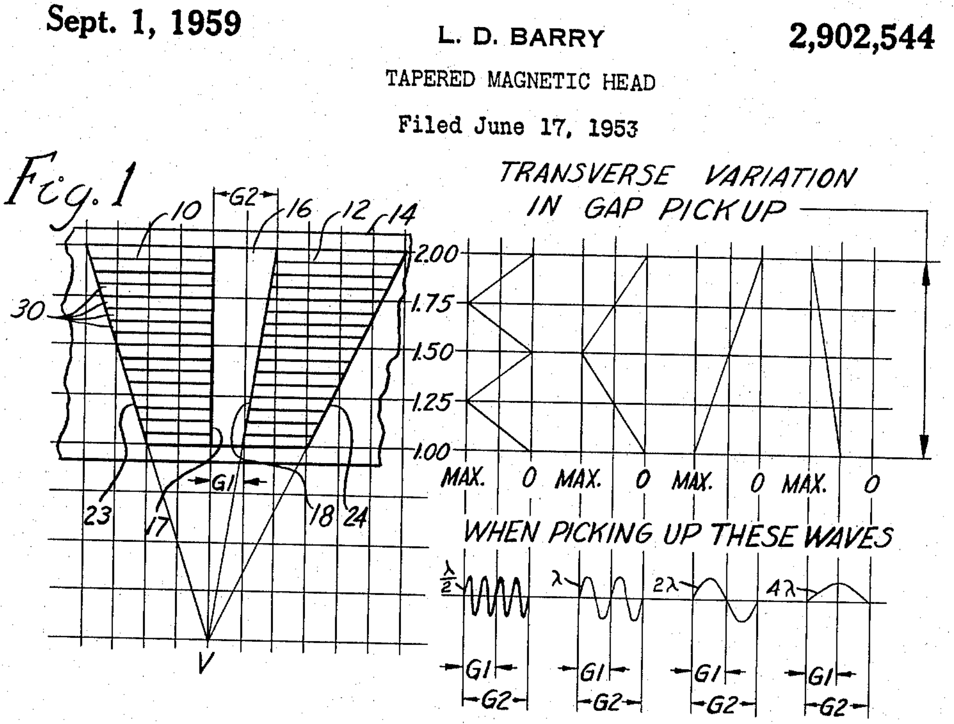
Figure 1 is a graphical plan view of tapered pole pieces of a reproducing head; unit lines laid off illustrate the relative dimensions; the output levels are graphically illustrated for various frequencies at corresponding points along the gap projected longitudinally; and the corresponding frequencies are illustrated graphically below each output chart.

Referring to the drawing and in particular to Figure 1, pole faces 10 and 12 on the recording medium 14 are separated by a tapered gap piece 16. One edge 17 of the gap is parallel to the recorded waves, which are parallel to the following edge on the recording head gap during recording. The other edge 18 of the gap is tapered to provide a two to one variation of the gap across the width of the pole pieces; that is, the gap at G2 at one side of the poles is two times the gap G1 at the other side of the poles. The faces of the poles preferably vary proportionately to the gap and are, as here shown, at any point across the transverse face of the poles a whole even multiple of the gap width at that point. Thus lines extended from along the outer transverse pole face edges 23 and 24 meet at point V together with lines extended from along edges 17 and 18.

The foregoing description did not take into account the difference between the physical gap and the effective gap. The effective gap is larger than the physical gap and varies according to the physical gap increasingly the smaller the physical gap. The effective gap reaches a minimum of about .0005 inch with no physical gap spacer, is approximately double the physical gap of .0005, but on some large gaps is only about 10% larger than these large gaps. Figure 1 is therefore meant to represent the effective pole faces separated by the effective gap. Modifying the pole faces to take into account the effective gap will give pole faces in which lines 17 and 18 will meet before reaching point V at which lines 23 and 24 approximately still should meet, and the actual gap ratio will be greater than two to one for optimum results.

Operation of this head is explained by reference to Figure 1. Let the vertical lines transverse to the pole pieces represent a wave length λ so that the gap G1 is one wave length in width, then G2 is two wave lengths in width. A wave length represents two recorded half-wave magnets with poles opposing. Thus say one is north-south, then the adjoining half-wave magnet is south-north. Pole tips spanning this span from north to north or across points of equal polarity provide no signal for playback. This "gap effect" is well known and is generally considered a limitation on the ability of a reproducing head to pick up recorded frequencies. The pole tips spanning half-wave magnets and odd multiples thereof provide maximum pickup, while pole tips spanning even multiples of half-wave magnets provide zero pickup. Thus a two to one taper of the gap piece enables equal pickup of frequencies having wave lengths equal to or less than the widest portion of the gap. The taper averages out i.e. cancels wave lengths equal to and less than the wave span of the tapered pole tip edge, while the other pole tip reproduces the signal in cooperation with portions of the tapered pole selected according to the wave length. The demagnetizing effect to which the recording in the gap is subject, compared to the lesser demagnetizing effect which the recording covered by the poles has, helps enable pickup of flux across pole tips.

Figures 2, 3:
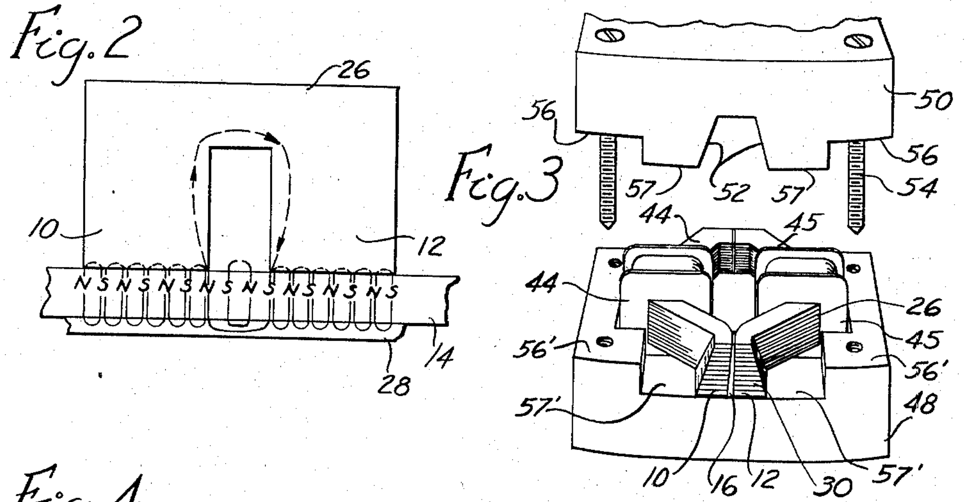
Figure 2 is a schematic representation of the playback process taken longitudinally through the tapered head and recording medium.
Figure 3 is a perspective view of the reproducing head with a clamping block above ready to be put in place.

Referring to Figure 2, head 26 is schematically shown with a flux linkage from north to south pole across pole tips spanning 1½ wave lengths on magnetic medium 14. It is hereby also seen that to have a net flux linking through the head from pole tip to pole tip the other recorded half-wave magnets under the pole pieces should not cancel or reduce the effect of the recorded magnets between the poles. It is preferred that the pole faces vary in width longitudinally to be a whole even multiple of the effective gap in line longitudinally therewith. Such an arrangement is suitable for reproducing perpendicular recording with a magnetically soft backing 28 against the magnetic recording medium, since then the flux selectively closes through the backing with the polarity under the pole faces other than that across the gap remaining approximately neutral when a steady recorded frequency is passed under the poles.

As shown in Figure 1 the effective pole faces are twice as wide as the effective gap on any longitudinal line across the head. The pole faces are in shape trapezoids with parallel sides aligned.

The tapers on the exterior faces of the poles also help nullify the signal spanned by the pole faces. Thus with three of the four transverse edges tapered relative to the recording, the pole face edge which is aligned with the recording is the only pickup edge, and conflicting pickup from other edges is reduced to a minimum.

The pickup of a given wave length across the pole tips at points longitudinally opposite vary transversely through maxima and minima along the head gap edge as illustrated in Figure 1 for several different wave lengths. The vertical lines 1.00 through 2.00 represent units of transverse displacement across the head corresponding to the particular gap in line longitudinally therewith. For wave lengths of G2 and below, as λ/2, λ and 2λ shown, this variation is from zero to maximum; and across the head the pickup always includes a maximum and a minimum point thereby averaging (since the tapered edges are straight) ½ of maximum pickup. For wave lengths greater than 2λ, as 4λ shown, the intensity of pickup approaches maximum as long as half waves shorter than the outer pole face edges are encountered, which at 4λ is a variation from ½ maximum to maximum averaging ¾ of maximum.

The pole faces should be laminated as shown in Figures 1, 3, 4, and 5 and the laminations 30 preferably separated by nonmagnetic spacing sheets 32 (shown in Figures 4 and 5) so as to prevent shorting of the flux loops between points along the tapered edge of the gap, since these points will be at different magnetic potentials. With the recording medium 14 making good contact, the spacing between the laminations can be omitted.

Figure 1 also shows the number of wave lengths spanned at each end of gap 16 for the wave lengths 4λ, 2λ, λ and λ/2, where λ is a wave length equal to the narrowest point G1 on the gap.

The ring-type head 26, shown in Figure 3, has yoke or core pieces 40 and 41, which have coils 44 and 45 and tapered pole tips 10 and 12 respectively. In assembly the yoke pieces with their coils are placed on a base clamping block 48 with the broad sides of their pole tips engaged therewith and the gap shim 16 between the pole tips with wide edge down against block 48. Outer clamping block 50 has a tapered recess 52 to cover and clamp pole tips 10 and 12 against shim 16 and to base block 48 by means of four screws 54. Faces 56 and 57 on block 50 do not quite fit tight against faces 56' and 57' on block 48, so that screws 54 exert pressure on notch 52 clamping the pole tips and shim tightly. At the rear similar wedges can clamp the yokes, or surface clamping without wedging can be provided.

Figure 4:
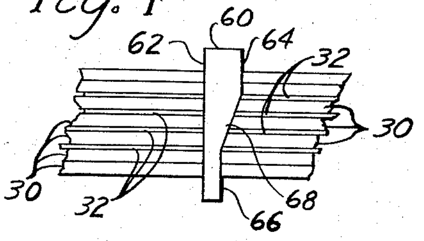
Figures 4 and 5 are partial views of two variations of pole faces and gap shims.
Figure 5:
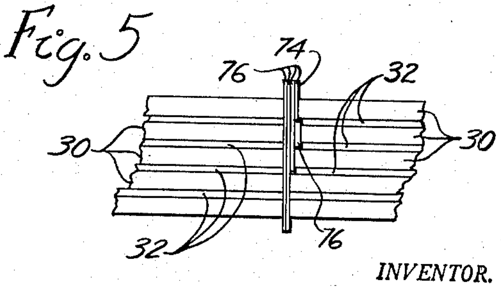

Figures 4 and 5 show variations of the pole and wedge pieces.

In Figure 4 tapered gap piece 60 has a normal face 62 on one side and two faces or steps 64 and 66 parallel to 62 separated by a taper or slope 68 on the other side. Laminations 30 are separated by spacers 32 abutting taper 68 and opposite thereto. This arrangement provides flat portions which help prevent cutting or slippage of the gap piece when the pole pieces are clamped thereagainst.

In Figure 5 gap piece 74 is composed of thin shims 76. Laminations 30 are separated by different numbers or thicknesses of shims 76. This simplified construction should give approximate results according to factors such as the number and proportioning of the shims and laminations.

The heads described can be used for recording purposes; but they are not preferred for this use, because the flux will prefer to link across the shortest gap G1 in preference to G2 and intermediate spans, and the recording intensity will therefore vary transversely across the recording track.

Having thus described a few embodiments of this invention it is understood that various modifications and variations come within the spirit and scope of this invention as claimed.

I claim:

1. On a magnetic head, two pole pieces each having a face arranged to contact the same surface of a recording medium, a gap between said pole faces varying in length between said pole faces substantially a whole even multiple of its minimum length therebetween, said pole faces having boundary edges substantially in the form of trapezoids the parallel sides of which are substantially aligned and the nonparallel sides of which form an arrangement such that lines extended from along all the nonparallel edges meet substantially at a common point.

2. On a magnetic head, two pole pieces each having a face arranged to contact the same surface of a recording medium, a gap piece between said pole pieces, said gap having tapered faces in contact with tapered surfaces on said pole pieces whereby the width of the gap varies in thickness along said pole faces, the length of each said pole face varying across its face in proportion to the length of the effective gap in line therewith.

3. On a magnetic head; two pole pieces each having a face arranged to contact the same surface of a recording medium; a gap piece between said pole faces; said gap piece having a transversely tapered face in contact with a transversely tapered face on one said pole piece and the opposite face of said gap piece contacting the other said pole piece and aligned with respect to the coverage of the medium by the recording gap edge; and means holding said pole pieces, with gap piece between, together, the length of each said pole face varying across its face in proportion to the length of the effective gap in line therewith, said taper on said gap piece varying the gap across said pole faces with substantially a one to a whole even multiple ratio thereof.

4. A ring-type magnetic head which includes, two yoke pieces having trapezoidal pole face boundaries, a tapered gap shim, a first clamping block on which is placed the wide parallel sides of the trapezoidal faces of said yoke pieces, a second clamping block having a tapered recess which fits over the outer tapers of said yoke pieces whereby said second clamping block clamps said shim between said yoke pieces and said yoke pieces and said shim against said first clamping block.

5. On a magnetic reproducing head, a laminated core having poles whose faces are arranged to engage the same face of a magnetic medium, gap filling means having variable thickness separating the pole tips of said poles so that the effective gap across the adjacent pole tip edges varies along the width of said head, the outer edge of each of said faces opposite said gap filling means being tapered relative to the opposite edge of the same face so that the pole faces are each in the form of a trapezoid, laminations of said core having an effective length substantially a whole even multiple of the effective gap in the plane of that lamination of said core.

6. On a magnetic head, a core having adjacent and outer transverse pole face sides, nonmagnetic gap piece means having varied thickness, securing means holding said adjacent pole face sides against said gap piece therebetween whereby the effective gap varies at different points along the adjacent pole face edges, said outer transverse sides being tapered forming trapezoidal pole faces which vary so as to have a length a whole multiple of the gap length in line therewith, said securing means having tapers which wedge said outer transverse sides so as to clamp said core together on said gap piece means.

7. In a magnetic head, stacked core laminations having a magnetic gap transverse to said laminations and gap piece means comprising stacked nonmagnetic laminations stepped and arranged in said gap so as to separate adjacent ends of each of said core laminations by a different number of said nonmagnetic laminations so as to vary the gap length at various core laminations across the face of said head.

8. A magnetic head gap piece having a flat side and parallel opposite faces each in a different plane on the same side of said gap piece, said opposite faces being joined by a flat face.

9. A ring-type magnetic reproducing head which comprises, two adjacent laminated yoke pieces, pole faces thereon, a gap shim having at least substantially a two to one variation in thickness separating adjacent sides of said pole pieces, whereby said pole faces are separated unevenly along their adjacent edges with at least a two to one variation of the gap between the faces of said poles, said faces varying in length across their width and their length being a multiple of the effective gap width in line therewith.

10. A ring-type magnetic head as claimed in claim 9, said gap shim having a flat face on one side and two flat faces parallel therewith on the opposite side and lying each in a different plane, a flat face connecting said two flat faces on a taper.

11. A ring-type magnetic head as claimed in claim 9, said gap shim comprising stepped laminations whereby the laminations of one said yoke piece is separated by various thicknesses of said laminations from the other said yoke piece, and nonmagnetic spacers separating the laminations of said yoke pieces.

12. On a magnetic head a core comprising magnetic laminations and nonmagnetic spacing sheets separating said magnetic laminations from each other and a nonmagnetic tapered gap piece crosswise said laminations and spacing sheets.

13. On a core as claimed in claim 12, a coil around said core linking all said laminations.

14. In combination on a magnetic reading device, a magnetic recording medium, a magnetically soft backing against said medium, a substantially perpendicular recording on said medium closed on one side of said medium through said backing, a magnetic head having two adjacent and opposite pole faces engaging the same face of said medium, said pole faces being separated by a tapered gap substantially transverse to the direction on said medium in which said recording was made and having substantially a one to a whole even multiple variation of the gap separating said pole faces across the width of said poles where engaged with said medium, said poles being laminated with laminations running to said gap, said laminations each having a pole face length equal to substantially a whole even multiple of the gap in the plane of the lamination.

15. A magnetic head which includes core means having trapezoidal pole faces adjacently arranged to engage the same side of a magnetic medium, a shim piece forming a gap between said pole faces, a first clamping block on which is placed the wide parallel sides of said faces, a second clamping block having a recess tapered to fit over the outer tapers of said core means, and means securing said first and second blocks together with said core means therebetween wedged together on said shim.

References Cited in the file of this patent

UNITED STATES PATENTS

| | | |
|---|---|---|
| 2,469,266 | Howell | May 3, 1949 |
| 2,535,712 | Wolfe | Dec. 26, 1950 |
| 2,536,810 | Holmes et al. | Jan. 2, 1951 |
| 2,596,912 | Nygaard | May 2, 1952 |
| 2,655,561 | Connell | Oct. 13, 1953 |
| 2,806,904 | Atkinson | Sept. 17, 1957 |
| 2,822,427 | Atkinson | Feb. 4, 1958 |

FOREIGN PATENTS

| | | |
|---|---|---|
| 504,932 | Great Britain | Apr. 25, 1939 |
| 683,797 | Great Britain | Dec. 3, 1952 |